US012384656B2

(12) United States Patent
Deng et al.

(10) Patent No.: US 12,384,656 B2
(45) Date of Patent: Aug. 12, 2025

(54) SYSTEM FOR MOBILE ROBOT TO AUTONOMOUSLY TAKE ELEVATOR

(71) Applicants: Tyco Electronics (Shanghai) Co. Ltd., Shanghai (CN); TE Connectivity Corporation, Berwyn, PA (US); Kunshan Sanxin Plastic Industiry Co. Ltd, KunShan (CN)

(72) Inventors: Yingcong Deng, Shanghai (CN); Dandan Zhang, Shanghai (CN); Roberto Francisco-Yi Lu, Bellevue, WA (US); Fengchun Xie, Shanghai (CN); Mingyang Weng, KunShan (CN)

(73) Assignees: TE Connectivity Solutions GmbH, Schaffhausen (CH); Tyco Electronics (Shanghai) Co., Ltd., Shanghai (CN); Kunshan League Automechanism Co., Ltd., Kunshan (CN)

( * ) Notice: Subject to any disclaimer, the term of this patent is extended or adjusted under 35 U.S.C. 154(b) by 1553 days.

(21) Appl. No.: 16/818,402

(22) Filed: Mar. 13, 2020

(65) Prior Publication Data

US 2020/0290843 A1 Sep. 17, 2020

(30) Foreign Application Priority Data

Mar. 15, 2019 (CN) ......................... 201910197908.9

(51) Int. Cl.
*B66B 1/46* (2006.01)
*B66B 1/34* (2006.01)
(Continued)

(52) U.S. Cl.
CPC ............ *B66B 1/468* (2013.01); *B66B 1/3461* (2013.01); *B66B 3/002* (2013.01); *B66B 13/02* (2013.01);
(Continued)

(58) Field of Classification Search
CPC .................. B66B 1/468; B66B 1/3461; B66B 2201/4638; B66B 1/14; B66B 2201/4653;
(Continued)

(56) References Cited

U.S. PATENT DOCUMENTS

2015/0266700 A1* 9/2015 Salmikuukka .......... B66B 1/468 187/380
2016/0139660 A1* 5/2016 Chu ...................... G06F 3/0362 345/156
(Continued)

FOREIGN PATENT DOCUMENTS

CA 2870914 A1 * 5/2016 ............. G06F 3/002
CN 113752269 A * 12/2021 ........... B66B 1/3461
(Continued)

*Primary Examiner* — Christina M Schreiber
(74) *Attorney, Agent, or Firm* — Barley Snyder

(57) ABSTRACT

A system for a mobile robot to autonomously take an elevator includes an elevator button pressing module mounted on an elevator floor control panel of the elevator. The elevator button pressing module communicates with the mobile robot wirelessly and is adapted to press a pair of elevator buttons on the elevator floor control panel according to an instruction issued by the mobile robot to call an elevator car.

14 Claims, 5 Drawing Sheets

(51) Int. Cl.
*B66B 3/00* (2006.01)
*B66B 13/02* (2006.01)

(52) U.S. Cl.
CPC . *B66B 2201/101* (2013.01); *B66B 2201/4638* (2013.01); *B66B 2201/4653* (2013.01)

(58) Field of Classification Search
CPC ........... B66B 1/46; B66B 1/3453; B66B 1/52; B66B 2201/463; B66B 2201/4607; B66B 2201/10; B66B 11/0226; B66B 2201/102; B66B 7/00; B66B 3/002; B66B 13/02; B66B 2201/101
USPC .......................................................... 187/380
See application file for complete search history.

(56) References Cited

U.S. PATENT DOCUMENTS

| | | | | |
|---|---|---|---|---|
| 2020/0061839 | A1* | 2/2020 | Deyle | G06Q 10/087 |
| 2020/0290843 | A1* | 9/2020 | Deng | B66B 1/3461 |
| 2021/0046650 | A1* | 2/2021 | Deyle | G05D 1/0214 |
| 2021/0046655 | A1* | 2/2021 | Deyle | B25J 9/1664 |
| 2021/0339399 | A1* | 11/2021 | Schluntz | G05D 1/0088 |
| 2021/0371236 | A1* | 12/2021 | Deng | B66B 1/3461 |
| 2023/0085751 | A1* | 3/2023 | Perko | B66B 1/468<br>187/380 |
| 2023/0399197 | A1* | 12/2023 | Alam | H01H 13/14 |

FOREIGN PATENT DOCUMENTS

| | | | | |
|---|---|---|---|---|
| DE | 102020203254 | A1 * | 9/2020 | B66B 1/3461 |
| DE | 102021113844 | A1 * | 12/2021 | B66B 1/3461 |
| JP | 2002302353 | A * | 10/2002 | |
| KR | 102282333 | B1 * | 7/2021 | |
| KR | 20220130743 | A * | 9/2022 | |
| KR | 20220132743 | A * | 10/2022 | |

* cited by examiner

SYSTEM FOR MOBILE ROBOT TO AUTONOMOUSLY TAKE ELEVATOR

CROSS-REFERENCE TO RELATED APPLICATION

This application claims the benefit of the filing date under 35 U.S.C. § 119(a)-(d) of Chinese Patent Application No. 201910197908.9, filed on Mar. 15, 2019.

FIELD OF THE INVENTION

The present invention relates to an elevator and, more particularly, to a system for a mobile robot to autonomously or automatically take an elevator.

BACKGROUND

In order to ensure the safety of elevators, third parties are generally not allowed to make any modifications to the elevators. Therefore, in the prior art, a mobile robot cannot control the elevator by communicating with the elevator control system. The mobile robot, consequently, can only move on a single floor and cannot move to another floor by autonomously taking the elevator; the elevator must be manually operated by a worker to transport the mobile robot to another floor if there is a need to move the mobile robot to another floor, limiting the application of mobile robots.

SUMMARY

A system for a mobile robot to autonomously take an elevator includes an elevator button pressing module mounted on an elevator floor control panel of the elevator. The elevator button pressing module communicates with the mobile robot wirelessly and is adapted to press a pair of elevator buttons on the elevator floor control panel according to an instruction issued by the mobile robot to call an elevator car.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
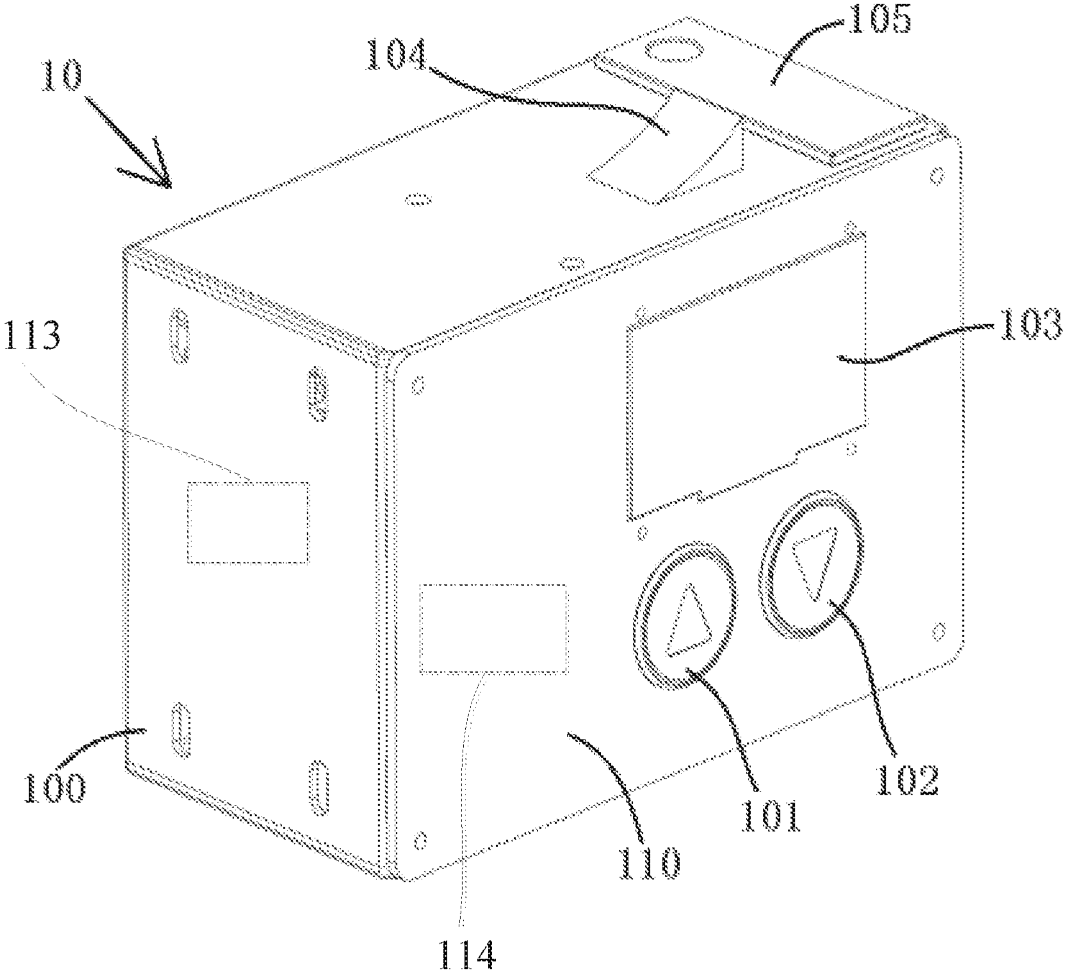
FIG. 1 is a front perspective view of an elevator button pressing module according to an embodiment.

The technical solution of the disclosure will be described in detail in the following embodiments with reference to the accompanying drawings. In the specification, the same or similar reference numerals denote the same or similar components. The following description of the embodiments of the present disclosure with reference to the accompanying drawings is intended to explain the general inventive concept of the disclosure and should not be construed as a limitation of the present disclosure.

In addition, in the following detailed description, for purposes of explanation, numerous specific details are set forth in order to provide a thorough understanding of the embodiments of the disclosure. However, one or more embodiments may be practiced without these specific details. In other instances, well-known structures and devices are shown in schematic form in order to simplify the drawing.

A system for a mobile robot 1 to autonomously take an elevator, as shown in FIGS. 1-5, comprises an elevator button pressing module 10. The elevator button pressing module 10 is mounted on an elevator floor control panel 20 of the elevator. The elevator button pressing module 10 communicates with the mobile robot 1 wirelessly, and is adapted to press corresponding elevator buttons 21, 22 on the elevator floor control panel 20 according to an instruction issued by the mobile robot 1 to call an elevator car.

Figure 2:
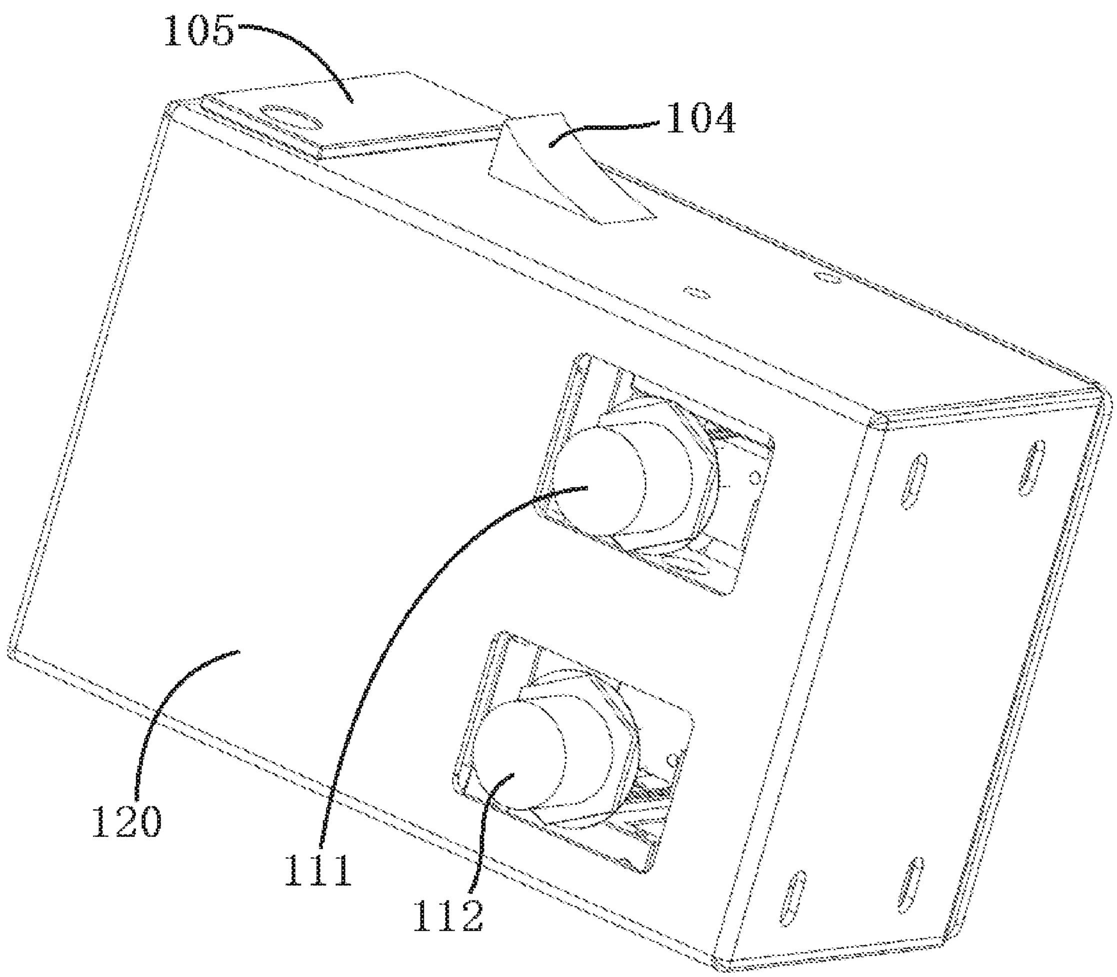
FIG. 2 is a rear perspective view of the elevator button pressing module.

The elevator button pressing module 10, as shown in FIGS. 1 and 2, includes a housing 100, a pair of virtual fingers 111, 112, a driver 113, and a controller 114.

As shown in FIGS. 1-5, the housing 100 is adapted to be mounted on the elevator floor control panel 20, and has a back side 120 facing the elevator floor control panel 20, and a front side 110 facing away from the elevator floor control panel 20.

The virtual fingers 111, 112, as shown in FIG. 2, are provided on the back side 120 of the housing 100 and are configured to be movable relative to the housing 100. The driver 113 is provided in the housing 100 and is used for driving the virtual fingers 111, 112 to move. The controller 114 is provided in the housing 100 and is used to control the driver 113.

The controller 114, shown in FIG. 1, is configured to communicate with the mobile robot 1 wirelessly and is adapted to control the driver 113 according to an instruction issued by the mobile robot 1. The driver 113 is adapted to drive the virtual finger 111 or 112 to move to press a corresponding elevator button 21 or 22 on the elevator floor control panel 20 under the control of the controller 114.

Figure 4:
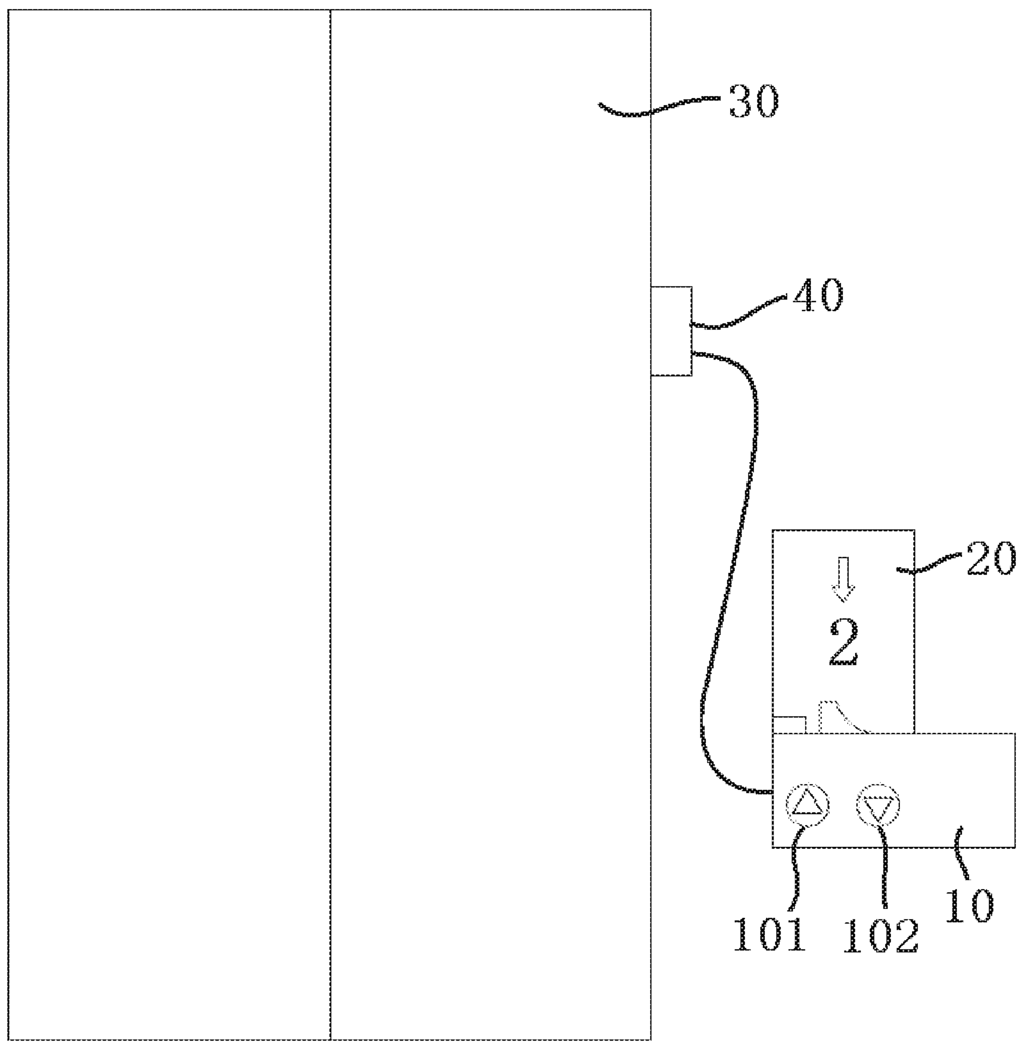
FIG. 4 is a perspective view of the elevator button pressing module mounted on the elevator floor control panel.
Figure 5:
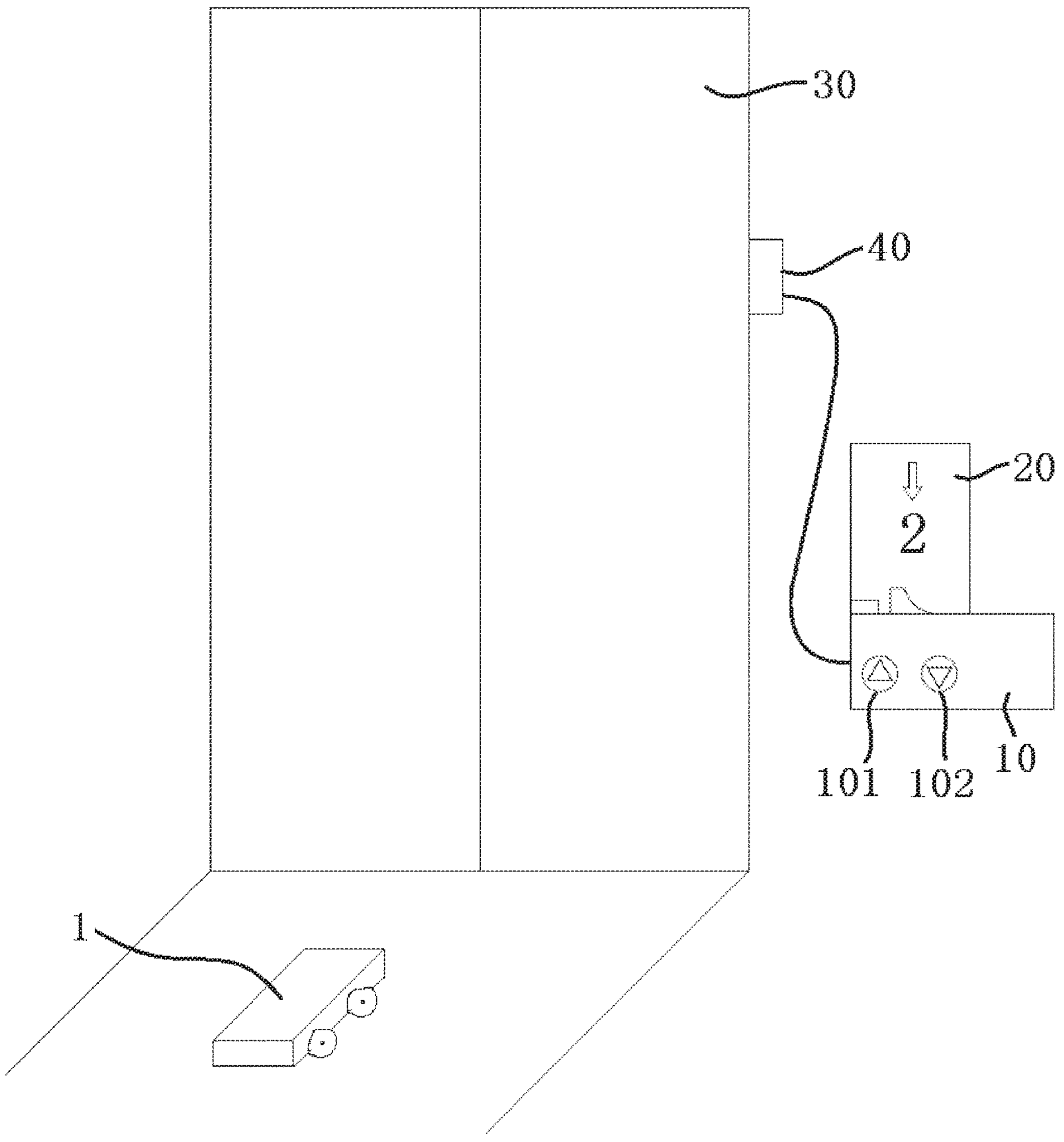
FIG. 5 is a perspective view of a mobile robot using the elevator button pressing module.

The elevator button pressing module 10 further comprises virtual buttons 101, 102. The virtual buttons 101, 102 are provided on the front side 110 of the housing 100, as shown in FIGS. 1, 4, and 5. The driver 113 is configured to, in response to the virtual button 101 or 102 being pressed, drive the virtual finger 111 or 112 to press the elevator button 21 or 22 corresponding to the pressed virtual button 101 or 102 on the elevator floor control panel 20 under the control of the controller 114.

The elevator button pressing module 10, as shown in FIG. 1, includes a display 103 provided on the front side 110 of the housing 100 and configured to display a working status of the elevator button pressing module 10 and/or the elevator.

The elevator button pressing module 10 further comprises a data interface 105, as shown in FIGS. 1 and 2. The elevator button pressing module 10 is adapted to be connected to an external device, for example, to an external computer, a sensor, or the like, through the data interface 105.

The elevator button pressing module 10, as shown in FIGS. 1 and 2, includes a power switch 104. The power switch 104 is provided on the top of the housing 100 and is used to control a power supply to the elevator button pressing module 10.

As shown in FIGS. 4 and 5, the system further comprises a sensor 40. The sensor 40 is provided near an elevator floor door 30, connected to the controller 114 of the elevator button pressing module 10, and configured for detecting whether or not the elevator floor door 30 is opened. The controller 114 of the elevator button pressing module 10 notifies the mobile robot 1 that it can enter the elevator car when the sensor 40 detects that the elevator floor door 30 has been opened. In various embodiments, the sensor 40 may be a non-contact distance sensor or an image sensor.

Figure 3:
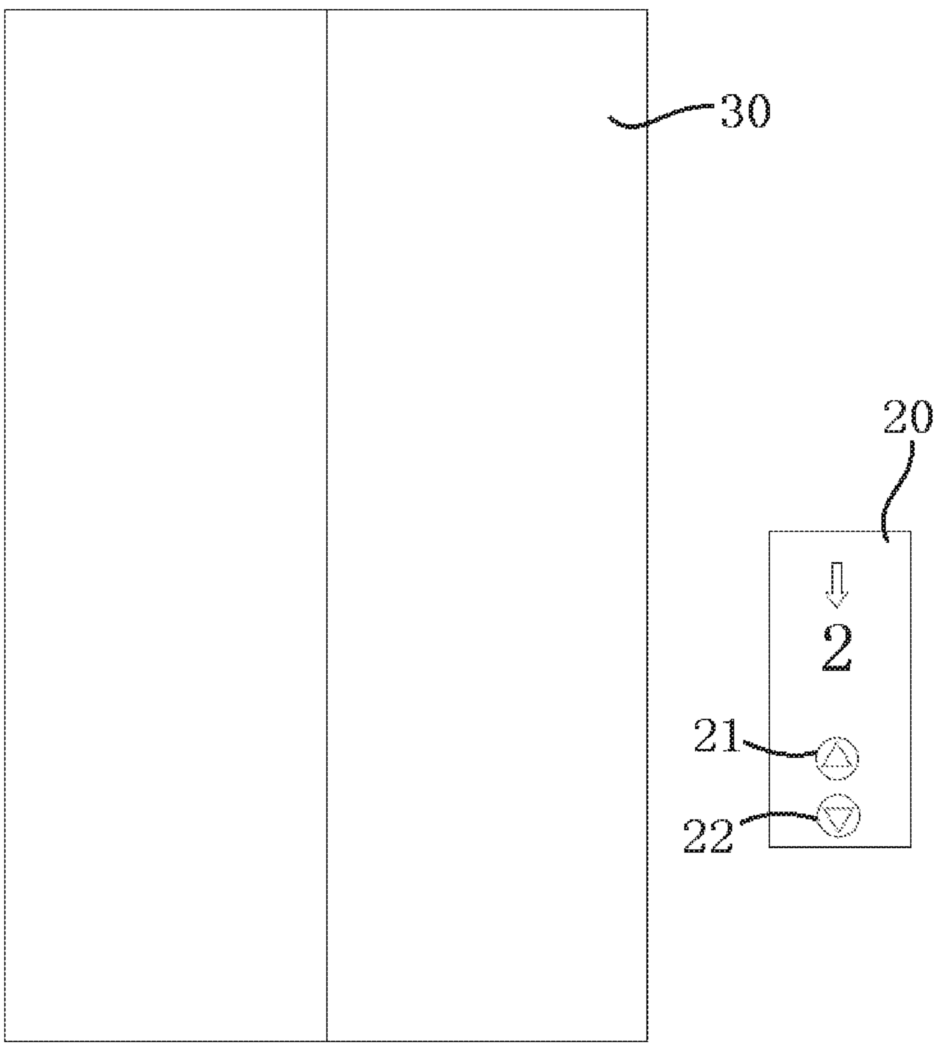
FIG. 3 is a front view of an elevator floor door and an elevator floor control panel according to an embodiment.

The elevator buttons 21, 22, shown in FIG. 3, include an elevator up button 21 and an elevator down button 22 provided on the elevator floor control panel 20. The elevator button pressing module 10 is adapted to press the elevator up button 21 and the elevator down button 22 on the elevator floor control panel 20.

The virtual fingers 111, 112, as shown in FIG. 2, include a first virtual finger 111 and a second virtual finger 112. The first virtual finger 111 is used to press the elevator up button 21, and the second virtual finger 112 is used to press the elevator down button 22. The driver 113 drives the first virtual finger 111 to press the elevator up button 21 under the control of the controller 114 when the mobile robot 1 issues an instruction to press the elevator up button 21. The driver 113 drives the second virtual finger 112 to press the elevator down button 22 under the control of the controller 114 when the mobile robot 1 issues an instruction to press the elevator down button 22.

The virtual buttons 101, 102, as shown in FIGS. 1, 4, and 5, include a first virtual button 101 and a second virtual button 102. The first virtual button 101 corresponds to the elevator up button 21, and the second virtual button 102 corresponds to the elevator down button 22. The driver 113 drives the first virtual finger 111 to press the elevator up button 21 under the control of the controller 114 when the first virtual button 101 is pressed. The driver 113 drives the second virtual finger 112 to press the elevator down button 22 under the control of the controller 114 when the second virtual button 102 is pressed.

In the foregoing various exemplary embodiments according to the present disclosure, the mobile robot 1 can autonomously take the elevator using the system. Therefore, the present disclosure expands the application range of the robots and does not require any modification to the elevator itself, which will not have any impact on the safety of the elevator.

Those skilled in the art will appreciate that the above-described embodiments are illustrative and can be modified, and that the structures described in the various embodiments can be freely combined without conflict in structure or principle. Although the present disclosure has been described with reference to the accompanying drawings, the embodiments disclosed in the drawings are intended to be illustrative explanation of the embodiments of the disclosure, and should not be construed as limiting the disclosure. Although several embodiments of the present general inventive concept have been shown and described, it would be appreciated by those skilled in the art that changes may be made in these embodiments without departing from the principles and spirit of the present general inventive concept, and the scope of the present disclosure is defined by the claims and their equivalents.

What is claimed is:

1. A system, comprising:

a mobile robot;

an elevator having an elevator floor control panel; and an elevator button pressing module mounted on the elevator floor control panel of the elevator, the elevator button pressing module communicates with the mobile robot wirelessly and is adapted to press a pair of elevator buttons on the elevator floor control panel according to an instruction issued by the mobile robot to call an elevator car, the elevator button pressing module includes:

a pair of virtual fingers on a back side of a housing;

a pair of virtual buttons on a front side of the housing;

a driver in the housing driving the virtual fingers to move relative to the housing; and a controller disposed in the housing and controlling the driver, the controller wirelessly communicates with the mobile robot, the driver drives one of the virtual fingers to move to press a corresponding one of the elevator buttons on the elevator floor control panel in response to one of the virtual buttons being pressed and under the control of the controller according to the instruction issued by the mobile robot.

2. The system of claim 1, wherein the housing is mounted on the elevator floor control panel, the housing having the back side facing the elevator floor control panel and the front side facing away from the elevator floor control panel.

3. The system of claim 1, wherein the elevator button pressing module includes a display on the front side of the housing, the display configured to display a working status of the elevator button pressing module and/or the elevator.

4. The system of claim 1, wherein the elevator button pressing module has a data interface connected to an external device.

5. The system of claim 1, wherein the elevator button pressing module has a power switch on a top of the housing and controlling a power supply to the elevator button pressing module.

6. The system of claim 1, further comprising a sensor connected to the controller of the elevator button pressing module and detecting whether or not an elevator floor door is opened.

7. The system of claim 6, wherein the controller notifies the mobile robot that it can enter the elevator car in response to the sensor detecting that the elevator floor door has been opened.

8. The system of claim 1, wherein the elevator buttons include an elevator up button and an elevator down button, the elevator button pressing module presses the elevator up button and the elevator down button.

9. The system of claim 8, wherein the virtual fingers include a first virtual finger used to press the elevator up button and a second virtual finger used to press the elevator down button.

10. The system of claim 9, wherein the driver drives the first virtual finger to press the elevator up button under the control of the controller in response to the mobile robot issuing an instruction to press the elevator up button.

11. The system of claim 9, wherein the driver drives the second virtual finger to press the elevator down button under the control of the controller in response to the mobile robot issuing an instruction to press the elevator down button.

12. The system of claim 8, wherein the virtual buttons include a first virtual button corresponding to the elevator up button and a second virtual button corresponding to the elevator down button.

13. The system of claim 12, wherein the driver drives the first virtual finger to press the elevator up button under the control of the controller in response to the first virtual button being pressed.

14. The system of claim 12, wherein the driver drives the second virtual finger to press the elevator down button under the control of the controller in response to the second virtual button being pressed.

* * * * *